Oct. 28, 1958 C. D. MULLINIX 2,858,057

PACKAGES

Filed April 19, 1954 4 Sheets-Sheet 1

CHARLES D. MULLINIX,
INVENTOR.

HUEBNER, BEEHLER,
WORREL & HERZIG,
ATTORNEYS.

BY

CHARLES D. MULLINIX,
INVENTOR.

HUEBNER, BEEHLER,
WORREL & HERZIG,
ATTORNEYS.

BY

Oct. 28, 1958 C. D. MULLINIX 2,858,057

PACKAGES

Filed April 19, 1954 4 Sheets-Sheet 3

CHARLES D. MULLINIX,
INVENTOR.

HUEBNER, BEEHLER,
WORREL & HERZIG,
ATTORNEYS.

BY Lorbert A. Huebner

Oct. 28, 1958 C. D. MULLINIX 2,858,057

PACKAGES

Filed April 19, 1954 4 Sheets-Sheet 4

CHARLES D. MULLINIX,
INVENTOR.

HUEBNER, BEEHLER,
WORREL & HERZIG,
ATTORNEYS.

BY [signature]

2,858,057
PACKAGES

Charles D. Mullinix, Cincinnati, Ohio

Application April 19, 1954, Serial No. 423,945
2 Claims. (Cl. 229—4.5)

The present invention relates to packages, and more particularly to packages adapted to contain food products such as cereal; baked and ready-to-bake biscuits, cookies, bread, doughnuts; dog foods; coffee; frozen foods and/or beverages, and many other food stuffs.

This application constitutes a continuation-in-part of my prior copending application Serial No. 52,108, filed September 30, 1948, now Patent No. 2,679,349. Briefly, packages disclosed in my copending application employ a tear strip adapted to be ripped manually around the package thereby to permit opening of the package. In some applications of these packages utilizing tear strips of this nature, it has been found that certain improvements are desirable.

For example, in the packaging of ready-to-bake biscuits and the like it has been found that there is an increase in internal pressure within the package many times the initial packing pressure. Specifically, such biscuits are known to tend to expand in all directions within a package to substantially twice their initial packing dimensions. Weakly constructed packages have been known to pop or explode endwise within hours after packaging. It will be readily apparent that in order for a package to contain such biscuits it must have a high degree of strength. Further, as will be subsequently more fully explained, this increase in internal pressure within the package prevents the convenient opening thereof by the heretofore known methods.

In one of the prior art packages presently utilized to package ready-to-bake biscuits, a substantially cylindrical container of heavy paper or the like is employed. This package is separable at the middle into distinct halves with one of the halves being telescopingly slidably interfitted into the other half. The package is provided with an outer imperforate layer of paper and a string circumscribes the container centrally and exteriorly thereof but beneath the outer layer of paper. The package is opened by pulling on the string and ripping the outer layer of paper around the container to enable sliding the halves of the container apart. With packages of this nature it has been found the biscuits sometimes overlap the halves of the package adjacent the joint between the separable halves. When the pressure of the biscuits is quite high it becomes difficult, if not impossible, to slide the halves apart after the string has ripped open the outer layer of paper.

To counteract this inability to separate the halves of the package due to extreme internal pressures, the prior art has utilized an inner lining in the package having an accordion-pleat immediaely beneath the joint between the separable halves and acting as an anti-friction member or lubricant effecting liner between the inner walls of the separable halves and the biscuits.

Packages constructed in the above described manner are difficult to manufacture economically due to the necessity of the spring-type zipper and the necessity for the inner lubricant effecting liner. As a result it is usually necessary to package more biscuits in one container than would be desirable inasmuch as fewer biscuits, considering the cost of the package, would not be considered an economic unit.

Considering further the disadvantages of the prior art packages and this time particularly in the field of frozen food packages, attention is called to the conventional rectangular box-shaped frozen food package such as are used to contain strawberries, and other fresh fruits. The ordinary manner of opening such a package is to puncture the package with a knife and then to saw or otherwise cut around the package in order to dump or scoop out the contents of the package. Besides the obvious inconvenience of opening a package in this manner, there is also a tendency for the partially melted contents thereof to spill and an appreciable amount of waste usually results therefrom.

Accordingly, it is an object of this invention to provide a compact package having characteristics of high strength and at the same time being capable of relatively easy manual opening without the need of knives or other utensils.

Another object is to provide a package capable of withstanding high internal pressures resulting from the expansion of the materials packaged therein.

Another object is to provide a package with a built-in opening means and wherein any internal pressures within the package aid rather than render more difficult the opening thereof.

Another object is to provide a package having a construction which enables the opening of the package with a minimum of spillage and resultant waste of the contents thereof.

Another object is to provide a package specifically for ready-to-bake articles such as biscuits wherein expansion thereof occurs after packaging thereof which package effectively resists such pressures without premature popping of the package and which package is easily manually opened.

Another object is to provide a package specifically for frozen foods and the like which resists splitting and/or cracking when under expansion due to freezing, which provides an effective seal for the packaged contents and which minimizes spillage and waste of the contents during opening thereof.

Another object is to provide packages of the foregoing nature which possess a high degree of strength, are easily and economically manufactured, and which provide effective protective characteristics for sealing in and maintaining the quality of the contents packaged therein.

There is considerable overlapping of inventive subject matter between the aforesaid copending application Serial No. 52,108 and this present case. That earlier case shows and claims structures which are adapted to the general purposes outlined in the foregoing statement of objects, but certain specific forms and improvement features are being presented in this present application.

Figure 1:
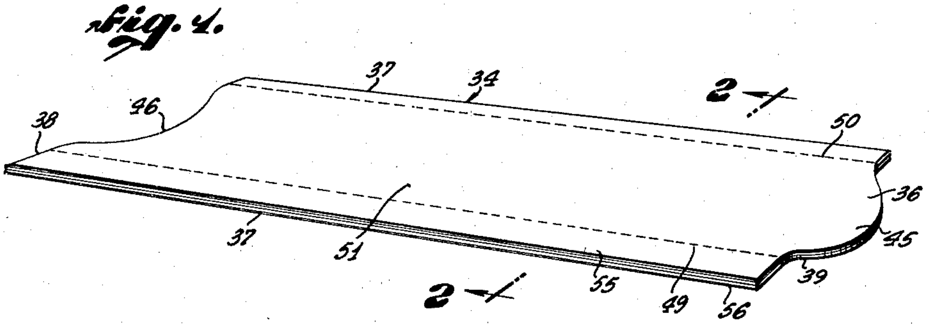
Figure 1 is a perspective view showing a package blank utilized in forming the package of this invention.

Referring more particularly to the drawings:

The packages of Figures 1 to 17 are excellently suited to the packaging of ready-to-bake biscuits, cookies, rolls, bread, doughnuts, and the like. Although the packages are described in relation to such biscuits it is not intended to limit the invention to this particular use, and as the description proceeds, it will be readily apparent that the packages may be used to contain many other items such as cereals, cookies frozen foods, dog foods and the like.

In the form shown in Figures 1 to 6, the completed package is generally indicated by the numeral 30 and is provided with a central body portion 31 and a pair of end walls or other closure members 32—32.

The body portion 31 of the package is formed from a laminated blank 34 including an assembly of at least one substantially rectangular inner layer or sheet 35 and at least one substantially rectangular outer layer or sheet 36. The outer sheet is superposed in overlying relation to the inner sheet with the corresponding edges thereof being coincident and defining thereby a pair of longitudinal edges 37—37, a transverse edge 38 and a transverse edge 39. For descriptive convenience the dimension between or transverse to the longitudinal edges 37 is herein referred to as the width or transverse dimension, although it will be apparent that in the formed package, this dimension becomes the length or longitudinal dimension of the package. Obviously the terminology employed is arbitrary and could be interchanged without affecting the principles of the invention.

The sheets are bonded together by an adhesive 40 throughout substantially their entire area for rendering the package to be formed therefrom substantialy impervious to air. Although not essential to this form of the invention, it is preferable that the adhesive utilized permit the severance of the outer sheet 36 from the inner sheet by manual manipulation. In any case, however, the adhesive should bond the sheets together throughout their entire areas inasmuch as the mere spot connection or bonding of the sheets would subject the package to the formation of mold between the sheets.

Figure 2:
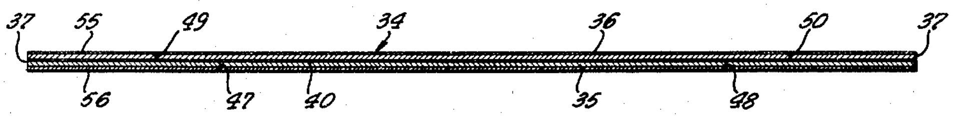
Figure 2 is a transverse cross-section taken along the lines 2—2 in Figure 1.

For a purpose subsequently to become apparent, the transverse edge 39 is provided with a tab 45 and the transverse edge 38 is provided with a corresponding complementary cut-out portion 46. Actually the cut-out 46 represents the area left when the tab of an adjacent blank is severed from blank 34, that is, assuming the blanks are formed from a continuous roll. A pair of lines or rows of parallel perforations 47 and 48 are provided on the inner sheet 35 which extend longitudinally throughout substantially the entire length thereof adjacent to opposite longitudinal edges 37 thereof. Likewise, the outer sheet 36 is provided with a pair of lines or rows of parallel perforations, also extending longitudinally throughout substantially the entire length of the sheet and adjacent longitudinal edges thereof. Reference to Figure 2 illustrates that the lines of perforations 47 and 48 on the inner sheet are positioned between the perforation lines 49, 50 in the outer sheet so that the lines of perforations in each sheet are sealed by the other sheet. Otherwise stated, each line of perforations is disposed opposite an imperforate region of the other sheet. The perforation lines define therebetween a tear strip 51 which is positioned parallel to the longitudinal edges of the sheets and which extends throughout substantially the full width of the sheets. It will be noted that the tab and cut-out portion lie at opposite ends of the tear strip and actually constitute a portion thereof.

Preferably, although not necessarily, the outer surface of the outer sheet 36 is provided with a thin layer of foil 55. Since this foil layer ultimately is disposed on the exterior surface of the completed package, it adds the appearance of a metal cover besides providing the package with a foil seal. In this regard it should be recognized that oftentimes packages of biscuits and the like are stored in refrigerated display cases and thus the packages are subjected to moisture and resultant condensation. The foil layer, therefore, acts as an anti-moisture resistant cover or seal for the package. The foil also provides a convenient printing base.

Likewise the inner surface of the inner sheet 35 may be provided with a thin layer of grease-proof paper or similar coating 56. The advantages of this grease-proof layer in the application of these packages is believed to be readily apparent. In the disclosed embodiment the lines of perforations extend through both the foil and grease-proof paper but as will be hereinafter noted in greater detail the foil may be imperforate.

Figure 3:
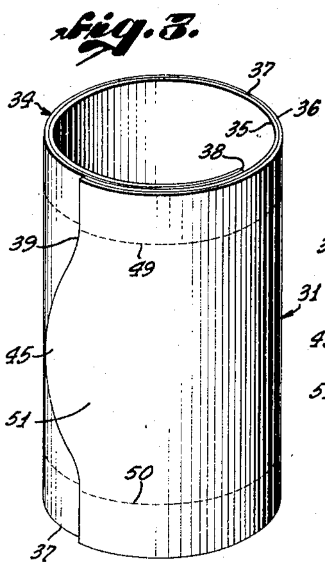
Figure 3 is a perspective view of a package formed from the blank shown in Fig. 1 but with the end walls removed therefrom.

As shown in Figure 3, the package initially is formed by wrapping the blank 34 including the assembly of bonded sheets around a cylindrical mandrel, not shown, with the lines of perforations extending around the cylindrically formed body in planes parallel to the longitudinal edges 37 of the sheets. The meeting transverse edges 38 and 39 of the wrapped-around sheets are overlapped as flaps with their entire mutually contiguous surfaces being bonded together, one outside the other, and with the edge 39 including the tab 45 disposed exteriorly of the wrapped assembly. The exposed edge 39 of the outer flap is disposed transversely to the rows of perforations and lies entirely outside the outer surface, or foil layer, of the other flap.

Figure 5:
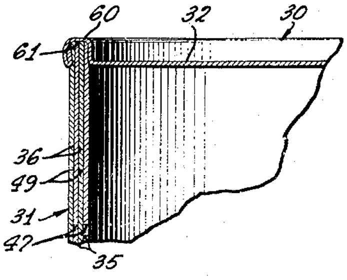
Figure 5 is a fragmentary cross-section taken along the lines 5—5 in Figure 4.

The end walls 32 are then attached to the opposite wrapped-around longitudinal edges 37 of the formed body 31 of the package. As shown in Figure 5, each of the end walls is provided with an annular rim 60 defining therein an annular groove 61. The longitudinal edges of the body are inserted in this annular groove and the sides of the rim are squeezed together, thereby compressing the edges of the sheets in tightly compact relation therebetween.

Although specifically not forming a part of the present invention, it should be noted that a quantity of biscuits, as 65, or other material to be packaged is placed within the body 31 of the package, ordinarily after one end wall has been installed but prior to the connection of the second end wall.

Figure 4:
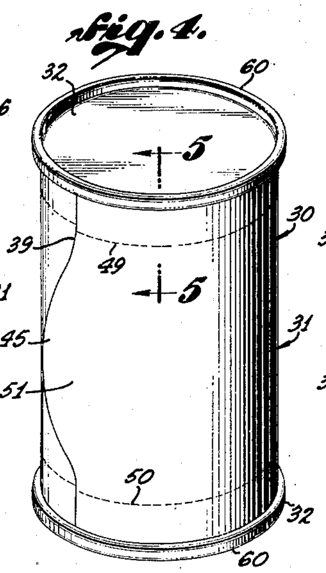
Figure 4 is a view similar to Figure 3 but showing the end walls applied to the completed package.
Figure 6:
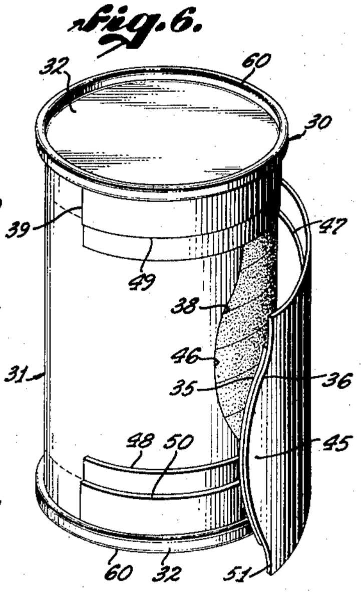
Figure 6 is a view similar to Figure 4 but showing the manner in which the package is opened and exposing a portion of the contents thereof.

The package 30 in its completed form is shown in Figure 4 and it will be evident that the tab 45 is readily accessible for grasping with the fingers to rip back the tear strip whereby the package may be opened, as shown in Figure 6.

The use of a tear strip 51 which extends throughout substantially the entire width of the package is highly advantageous when the package is used to house unbaked biscuits. Biscuits of this nature have a tendency to rise after being placed in the package and in a period of approximately thirty minutes to an hour the internal pressure created by such biscuits is exceedingly high. As noted above, such unbaked biscuits have a tendency to expand in all directions even more than twice their initial dimensions. Considering, by way of comparison, a very narrow tear strip, it has been found that due to the excessive pressure created by this expansion, biscuits overlap or bridge the gap created between the halves of the package when the tear strip has been removed and prevent pulling apart of the halves of the package even after the tear strip has been completely separated from the body of the package. By using a wide tear strip, as shown in Figures 1 to 6, substantially the entire package is opened when the tear strip is removed and overlapping of the biscuits against separated halves of the package is obviated.

*Second form*

Figure 7:
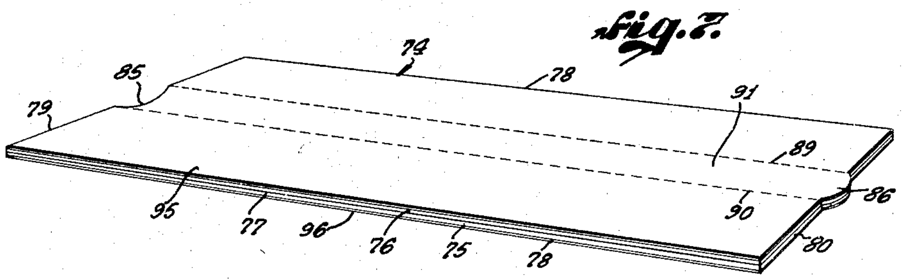
Figure 7 is a perspective view of a package blank of a second form of the present invention.
Figure 8:
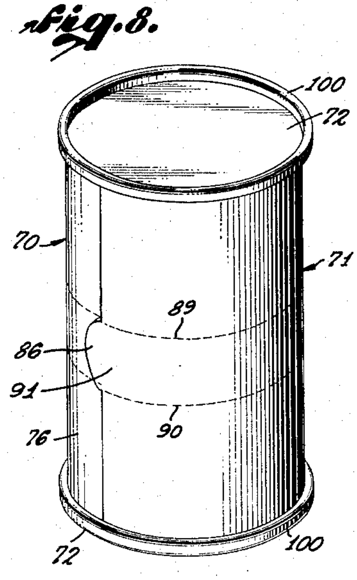
Figure 8 is a perspective view of a completed package as provided in the second form of the invention.
Figure 9:
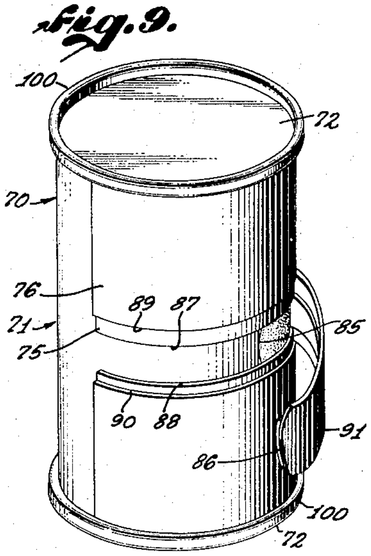
Figure 9 is a view similar to Figure 8 but showing the manner of opening the package provided by this form of the invention.
Figure 10:
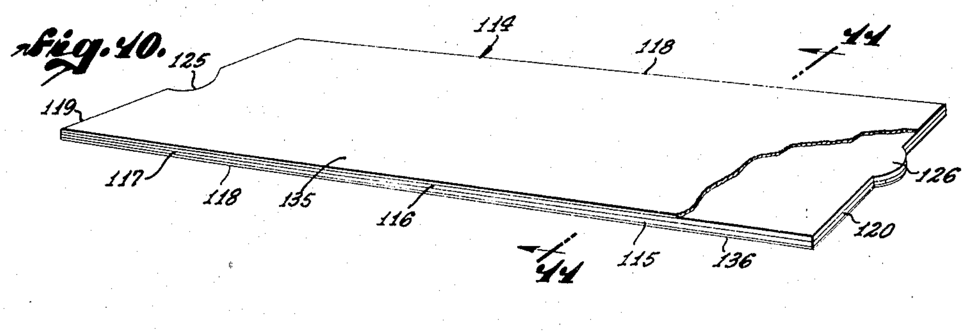
Figure 10 is a perspective view of a package blank of a third form of the invention.
Figure 11:
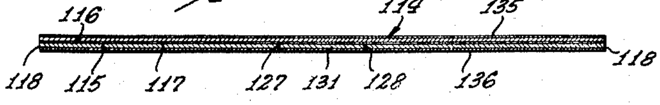
Figure 11 is a transverse cross-section taken along the lines 11—11 in Figure 10.
Figure 12:
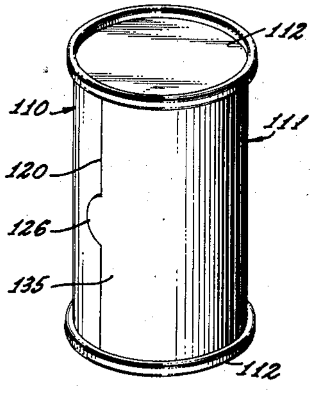
Figure 12 is a perspective view of a package formed from the blank shown in Fig. 10.
Figure 13:
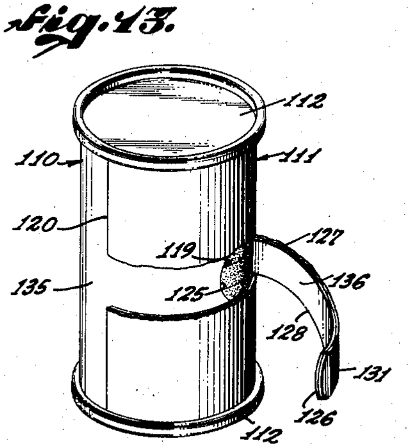
Figure 13 is a perspective view similar to Figure 12 but showing manner of opening this form of the package.
Figures 14, 16, 17:
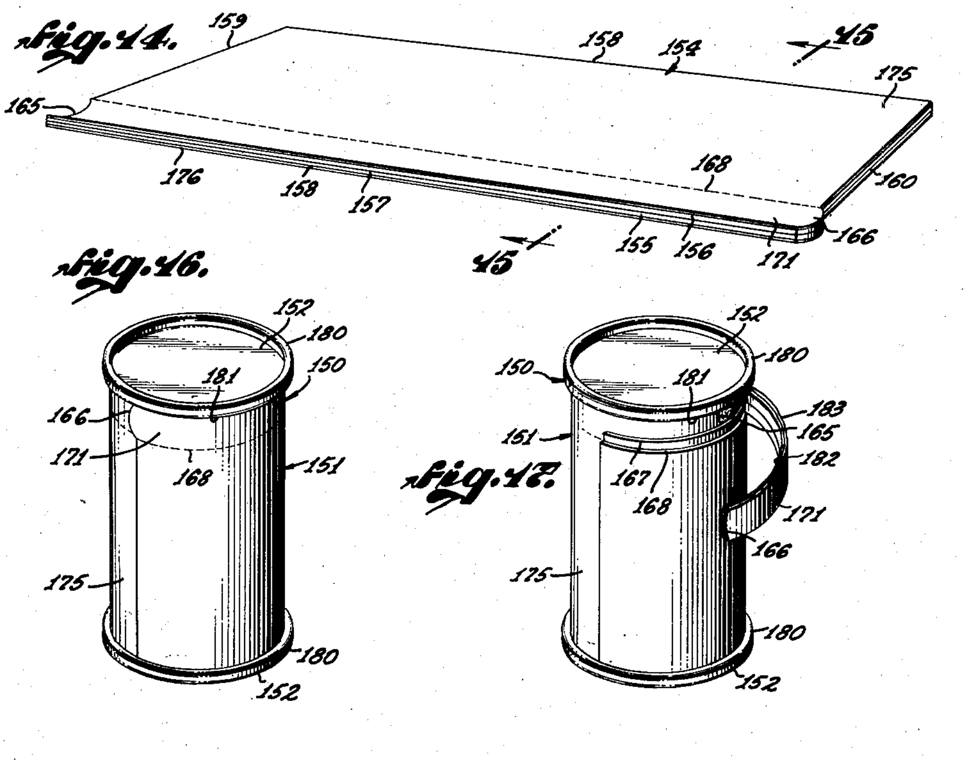
Figure 14 is a perspective view of a package blank used in constructing a fourth form of the present invention.
Figure 16 is a perspective view showing a package formed from the blank of Figure 14.
Figure 17 is a view similar to Figure 16 showing the manner of opening this form of the package.
Figure 15:
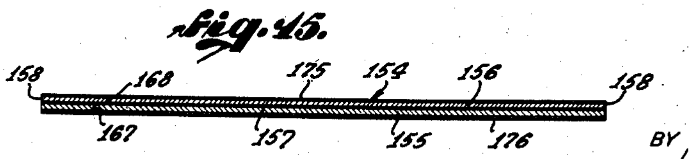
Figure 15 is a transverse cross-section taken along lines 15—15 of Figure 14.

The package of Figures 7 to 9 inclusive is indicated generally by the numeral 70 and is provided with a body portion 71 and a pair of end walls 72—72. This package is in many respects similar to the package 30 of Figures 1 to 6 except for the width of the tear strip. Therefore, no specific description will be given herein of the package 70 except to point out the various elements included therein.

Accordingly, the body 71 is constructed of a blank 74 comprising an inner sheet 75 severably bonded to an outer sheet 76 by an adhesive 77. The sheets are in overlying coincident relation and define longitudinal edges 78—78 and transverse edges 79 and 80.

The blank 74 has a cut-out portion 85 on the transverse edge 79 and a tab 86 on the transverse edge 80. Each of the sheets 75 and 76 is provided with a pair of lines of perforations 87, 88 and 89, 90, respectively, extending longitudinally throughout substantially the entire length of the sheets parallel to the longitudinal edges thereof. As before, the lines of perforations on the inner sheet are disposed intermediate the lines of perforations on the outer sheet and the portion of the bonded assembly of sheets between the lines of perforations forms a tear strip 91.

The outer sheet 76 may be provided with a thin foil layer 95 and the inner sheet 75 may be provided with a thin layer of grease-proof material or paper 96, as in the previous embodiment.

The package 70 is formed by wrapping the blank 74 around a mandrel or the like as before and subsequently attaching the end walls 72 to the longitudinal edges thereof. The end walls are provided with rims 100 for insertion over the longitudinal edges for tight connection thereto.

It will be quite apparent that the tab 86 is disposed exteriorly of the package and is readily accessible for manual grasping to open the package as shown in Figure 9.

As stated, this package is quite similar to that of Figures 1 to 6 and is useful in applications of the package where the previously noted internal pressure problem is less acute and, therefore, a narrow tear strip may be preferred over the wide tear strip of Figures 1 to 6.

*Third form*

The package 110 of Figures 10–13, inclusive, is provided with a body portion 111 and a pair of end walls 112—112.

Again a blank 114 is provided and is constructed similarly to the blanks hereinbefore described except for the construction of the outer layer. Thus, the blank 114 includes an inner sheet 115 and an outer sheet 116 which are severably bonded together by a layer of adhesive 117 therebetween. The overlaid sheets define longitudinal edges 118—118 and transverse edges 119, 120.

A cut-out 125 and a tab 126 are provided along the transverse edges 119, 120, respectively. The inner sheet 115 is provided with a pair of lines of perforations 127 and 128 which extend longitudinally throughout substantially the entire length of the sheet parallel to the longitudinal edges thereof. This package is distinct from those described above in that the outer sheet 116 is imperforate throughout. The portion of the inner sheet between the lines of perforations therein defines a tear strip 131. As before, the outer sheet may include a thin foil layer 135 and the inner sheet a grease-proof layer 136. Of course, the foil layer 135 of this form of the invention is likewise imperforate throughout.

The completed package, as shown in Figures 10–13, is formed as before, and includes the end walls 112 which are attached in a manner already described to the longitudinal edges 118 of the package.

In use, the tab 126 disposed on the exterior of the package is grasped manually to pull back the tear strip 113, whereupon the package can be opened. In this package, however, the lines of perforations 127 and 128 on the inner sheet guide the tearing of the outer sheet and included foil layer during the opening of the package and thus effect a severance of the outer sheet along shear lines 129 and 130, which necessarily lie substantially in coincident planes or coplanar regions with the lines of perforations on the inner sheet.

This form of the invention is best suited to situations where an added measure of strength is needed in the walls of the package. This strength is provided by eliminating the lines of perforations in the outer sheet which necessarily weaken somewhat the body of the package. It should also be noted that an improved sealing effect as well as a smoother outer finish is provided when perforations are eliminated from the outer sheet.

It will be readily apparent that although the package 110 is illustrated as having a narrow tear strip 131, it could be provided with a wide tear strip as shown in Figures 1 to 6. As will be described more particularly hereinafter, it may be desirable, when constructing a package as shown in this form of the invention, to vary the thickness or composition of the outer sheet whereby it is more readily shearable than the inner sheet inasmuch as there are no lines of perforations in the outer sheet to guide the tearing action.

The extra strength obtained in the package may be needed when above average internal pressures are encountered. And, when an imperforate outer sheet is incorporated in a wide tear strip package, an exceptionally strong but easily openable package is provided. The additional strength results from the outer sheet, of course, and, as previously explained, the internal pressures do not present a serious detriment to the opening of the package with a wide tear strip.

*Fourth form*

In Figures 14 to 17 a package 150 having a body 151 and end walls 152—152 is shown.

The blank 154 from which the body 151 is constructed is quite similar to those previously described but incorporating still another form of tear strip. Thus the blank has inner and outer sheets 155 and 156 severably bonded by a layer of adhesive 157. The sheets are disposed in overlying relation with their edges coincident and define longitudinal edges 158—158 and transverse edges 159, 160. A cut-out portion 165 is provided adjacent one of the longitudinal edges 158 and a tab 166 is provided along transverse edge 160 adjacent to the same longitudinal edge as the cut-out portion.

Both the inner and outer sheets are provided with a single line of perforations 167 and 168, each of which extend longitudinally throughout substantially the entire length of the bonded assembly of sheets parallel to the longitudinal edges thereof. In this blank, however, these lines of perforations are disposed closely adjacent to one of the longitudinal edges 158 and the line of perforations in the inner sheet is interposed the adjacent longitudinal edge 158 and the line of perforations 168 in the outer sheet. Thus a relatively narrow tear strip 171 is formed.

As before, a layer of foil 175 and a grease-proof layer 176 may be provided. The blank 154 is wrapped around with the transverse edges 159 and 160 being overlapped and connected where the tab 166 is disposed exteriorly of the body 151 formed thereby. The end walls 152 each have a rim 180 which is fitted over the longitudinal edges of the body and tightly connected in place. The rim 180 of the end wall 152 adjacent to the tear strip 171 defines a peripheral cutting or tearing edge 181, a further distinguishing feature of this form.

In use, the tab 166 is grasped and pulled back to open the package. One edge of the tear strip 171 tears along the lines of perforations provided in the inner and outer sheets. However, the other edge of the tear strip is cut or severed along lines of shear 182 and 183 in the inner and outer sheets, respectively, by the cutting edge 181 on the rim of the end wall adjacent thereto.

It will be readily apparent that this form of the package is useful wherein it is desired to open the package from one end rather than centrally thereof. This package may be constructed with the modification of Figures 10 to 13 in that the outer sheet 156 including the foil layer 175 may be imperforate throughout, or the foil layer only may be made imperforate.

*Fifth form*

The package shown in Figures 18–22 is especially useful in packaging frozen foods such as fresh fruits or frozen beverage concentrates as will be more apparent hereinafter. However, as before, it is not intended to limit this form of the package to frozen foods since it may be used wtih many items of food of a non-frozen variety.

The package shown in Figures 18 to 22, inclusive, is generally indicated by the numeral 190 and is provided with a body portion 191 and a pair of end walls 192—192. The blank 194 from which the body 191 is formed provides an assembly including at least an inner sheet 195 and at least an outer sheet 196. The sheets are disposed in overlying relationship, being severably bonded together by an adhesive layer 197 whereby longitudinal edges 198—198 and transverse edges 199 and 200 are defined. The adhesive layer used may be of wax to permit ready severance or detachment of the sheets by finger manipulation. In contradistinction to the previously described embodiment, a cut-out 205 is provided on the inner sheet only.

The inner sheet 195 is provided with a single line of perforations 206 which extends longitudinally substantially the entire length of the sheet and is disposed centrally in parallel relation between the longitudinal edges thereof. The outer sheet 196 is provided with a pair of lines of perforations 207, 208 which extend longitudinally substantially throughout the entire length of the sheet and which are disposed on opposite sides of the line of perforations 206 in the inner sheet. The portion of the outer sheet 196 between the lines of perforations therein defines a tear strip 210.

As with the other forms of the invention, a foil layer 215 and a grease-proof layer 216 may be provided on the outer and inner sheets, respectively.

Figures 18, 19, 20, 21, 22, 23:
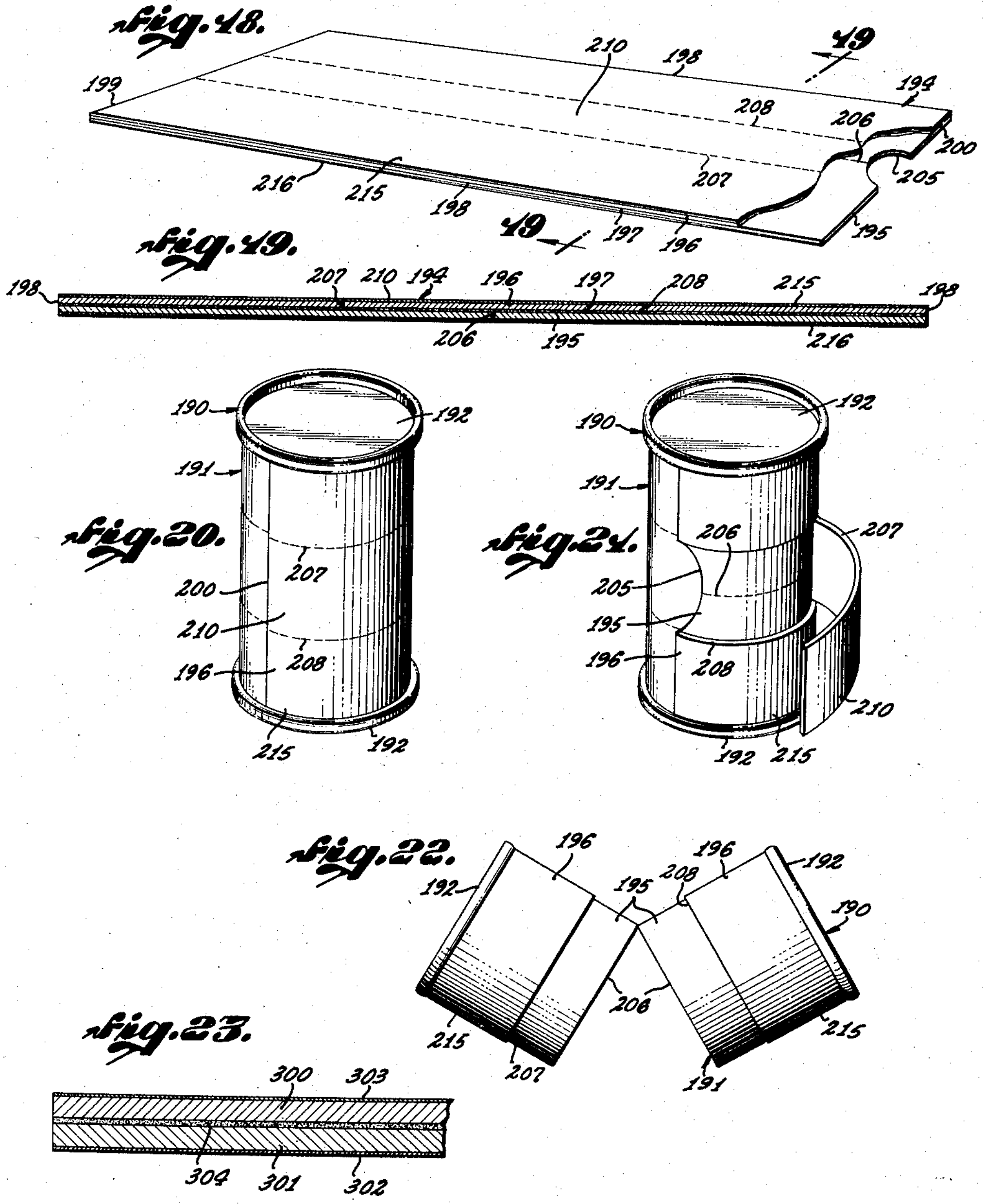
Figure 18 is a perspective view of a package blank used in constructing a fifth form of the present invention.
Figure 19 is a transverse cross-section taken along lines 19—19 of Figure 18.
Figure 20 is a perspective view of a completed package as formed by the blank of Figure 18.
Figure 21 is a view similar to Figure 20 but showing the initial step of opening this form of the package.
Figure 22 is a side view of the package shown in Figure 20 but illustrating the second step in opening this form of the package.
Figure 23 is a somewhat enlarged fragmentary cross-section of the plurality of layers utilized in the walls of the various forms of packages provided by the present invention.

This package is formed in the same manner as those previously described but it should be noted that since both the transverse edges of the outer sheet are rectangular and do not provide tabs or cut-out portions, the exterior overlapped portion of the body 191 defines a smooth exposed edge or seam, as shown in Figure 20.

In use, the tear strip 210 is pried open by the insertion of a finger or other instrument in the recess provided by the cut-out portion 205 in the inner sheet immediately beneath the smooth outer edge of the tear strip. The tear strip is then pulled outwardly whereby it is removed from the package exposing the central portion of the inner sheet and thus the single line of perforations 206 therein. The package 190 can then be grasped at each end thereof and cracked open by applying pressure by the thumbs to the center of the package relative to each end thereof, as shown in Figure 22, and the contents of the package then may be easily dumped or emptied into a suitable bowl or container, not shown.

This latter form of the invention is stated to be useful for frozen foods because of its strength and ability to resist splitting under internal expansion due to freezing. Further, this package seals in the juices and liquids prior to and during the opening of the package and prevents undesirable and wasteful spillage during opening. The well known disadvantages inherent in the prior art frozen food packages are obviated by providing the inner perforated line. This eliminates the necessity of having to puncture the package with a knife and then to attempt to saw or force it open. Still, substantially none of the sealing effect is lost due to the outer sheet incorporating an offset tear strip which is easily manually removed prior to cracking the package along the inner line.

Although not shown, there are several variations of the form of the invention shown in Figs. 18–22 which are to be noted. For example, the body 191 may be of a generally rectangular box-shape with rounded edges instead of a cylindrical form. Further, the outer foil layer of the outer sheet 196 may be imperforate as previously suggested in regard to the other forms.

Still another variation includes an intermediate sheet interposed between the inner and outer sheets 195 and 196, respectively. In such a case, the intermediate sheet may be specially treated to have protective sealing, strengthening and/or moisture-proofing characteristics and also would be provided with perforations. As to the latter, the lines of perforation in sheet 196 would be interposed the perforations in the intermediate sheet and together would form a unitary tear strip. This is similar to the effect which would be created by applying a blank such as 34 (Figs. 1–6) or 74 (Figs. 7–9) around only the inner sheet 195 of Figs. 18–22.

Carrying this latter variation utilizing an intermediate sheet even further, the outer sheet 196 could be imperforate with only the intermediate sheet having pairs of lines of perforations. This would, in effect, be a combination of blank 104 (Figs. 10–13) and only the inner sheet 195 of Figs. 18–22.

It will be apparent that the location of perforation lines 206 and 207, 208 is not limited to the exact center of body 191 although for the described method of opening is probably the most convenient. However, these lines may be moved anywhere between longitudinal edges 198 as long as line 206 remains interposed lines 207, 208.

In the basic construction of each of the blanks 34, 74, 114, 154 and 194, certain materials are preferably employed. For this purpose, Figs. 23 and 24 are intended to illustrate more exactly the nature of the blank construction and at least one combination of materials which can be used.

In Fig. 23, a blank is shown having an outer sheet 300 of one-hundred and fifty pound sulphite or bleached kraft pulp paper which is somewhat stiff though readily formable into the cylindrical or box-shapes contemplated by this invention. The material of the inner sheet 301 is identical. If employed, as shown, the protective layer 302 on the inner surface of inner sheet 301 may be twenty-five pound grease-proof paper intimately bonded throughout to the inner sheet so as to lose its identity as an individual sheet or layer apart from the inner sheet. Also, if employed, the foil layer 303 may comprise a foil sheet of .00035 inch thickness which is likewise intimately bonded to the outer sheet. The adhesive layer 304 conveniently may be a coating of wax on either or both the mating surfaces of the inner and outer sheets. In the event a permanent bond is preferred as might be in the forms including Figs. 1–17, a suitable cement or glue may be selected. For some purposes it is desired to be moisture proof, but for others need not be.

Figure 24:
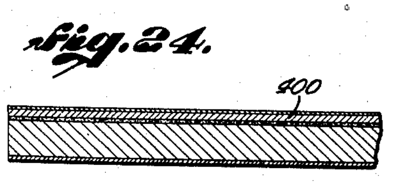
Figure 24 is a view similar to Figure 23 but showing a different combination of layer thicknesses from that shown in Figure 23.

The essential difference exhibited by the blank of Fig. 24 is that the sulphite sheets are of different weight. Thus outer sheet 400 is of twenty-five pound sulphate. This construction may be found desirable especially when the outer sheet is imperforate and thus a lighter sheet offering less tear resistance may be needed.

Although paper has been alluded to throughout, it is intended to include within the scope of this invention light metallic packages wherein cut-score lines or otherwise weakened areas are utilized instead of perforated lines.

Although some reference has been made above in the description of each of the various forms of this invention in regard to the possible modifications thereof, it is again emphasized that features from each of the various forms of the invention may be combined to provide packages useful under particular circumstances. Thus in all of the forms of the invention the outer layer of foil could be entirely imperforate; the outer sheet of the various forms of the invention, with the exception of the illustrated embodiment of Figs. 18–22, could be entirely imperforate such as that utilized in Figures 10–13; the wide tear strip of Figures 1–6 could be utilized in the forms of the invention shown in Figures 10–13, Figures 14–15 or in Figures 18–22; and, as noted in regard to Figures 18–22, an intermediate sheet of special protective material could be interposed between the inner and outer sheets, not only in the form of Figs. 18–22 but also in the other forms of the invention. Although perforations have been alluded to throughout the application, it will be understood that the invention is not so limited and alternatively could be replaced by weakened lines or scores in the paper. Further, if desired, any of the described forms could incorporate therein grease-proof marginal end flaps adapted to be folded over under the end covers.

In lieu of paper I may employ acetate film, or "Pliofilm" which is a rubber derivative, or other types of films or plastic sheet material, or foils. I may spray or otherwise apply a wax or other suitable coating on the inside surface of the blank or the container.

While metal ends are advantageously used, I may substitute end closures of other materials, such, for example, as paper or board caps, which can be cemented or glued on, or I may employ an end closure similar to that of a milk carton.

For some purposes, the package should be substantially impervious to air, but for others air-tightness is not essential.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent methods and products.

What I claim is:

1. A tear strip package comprising an assembly of sheets including an inner sheet and an outer sheet, the outer sheet overlying the inner sheet with the corresponding edges of said sheets being coincident and defining a pair of opposed longitudinal edges and a pair of opposed transverse edges of the assembly, a layer of adhesive material severably bonding said sheets together throughout substantially their entire area for rendering the package substantially impervious to air, the inner sheet having a line of low resistance to shear extending longitudinally throughout substantially the entire length thereof and disposed between said longitudinal edges, the material of said outer sheet being imperforate in the linear region thereof overlying the line of low resistance to shear in the inner sheet, the outer sheet having a pair of spaced apart lines of low resistance to shear extending longitudinally throughout substantially the entire length thereof and on opposite sides of said line of low resistance to shear in the inner sheet, said pair of lines in the outer sheet extending transverse to and through at least one of said transverse edges, the inner sheet having a portion thereof cut out from said one transverse edge as a recess, said recess having at least a portion thereof disposed between said pair of lines in the outer sheet, whereby a portion of the outer sheet contiguous said one transverse edge extends over said recess, said assembly being wrapped with around the marginal portions thereof adjacent said transverse edges respectively being overlapped as flaps and secured together, said one transverse edge being outside the other transverse edge.

2. A tear strip package according to claim 1, in which said lines of low resistance to shear are lines of perforations.

References Cited in the file of this patent

UNITED STATES PATENTS

| | | |
|---|---|---|
| 1,862,301 | Drexler | June 7, 1932 |
| 1,961,535 | Taylor | June 5, 1934 |
| 1,961,559 | Herrmann | June 5, 1934 |
| 2,020,804 | Segal | Nov. 12, 1935 |
| 2,275,896 | Geist | Mar. 10, 1942 |
| 2,305,428 | Johnson | Dec. 15, 1942 |
| 2,353,762 | Robinson | July 18, 1944 |
| 2,437,114 | Moore | Mar. 2, 1948 |
| 2,494,965 | Rosen | Jan. 17, 1950 |
| 2,608,341 | Eckman | Aug. 26, 1952 |
| 2,679,349 | Mullinix | May 25, 1954 |